United States Patent [19]

Hutson, Jr. et al.

[11] 3,903,194

[45] *Sept. 2, 1975

[54] HF ALKYLATION OF ISOPARAFFIN WITH OLEFIN HEAVIER THAN ETHYLENE WITH ETHYL FLUORIDE AS REACTION IMPROVER

[75] Inventors: Thomas Hutson, Jr.; Cecil O. Carter, both of Bartlesville, Okla.

[73] Assignee: Phillips Petroleum Company, Bartlesville, Okla.

[ * ] Notice: The portion of the term of this patent subsequent to Oct. 15, 1991, has been disclaimed.

[22] Filed: Apr. 9, 1973

[21] Appl. No.: 349,181

Related U.S. Application Data

[63] Continuation-in-part of Ser. No. 217,665, Jan. 13, 1972, abandoned.

[52] U.S. Cl. .......................................... 260/683.51
[51] Int. Cl. ............................................... C07c 3/54
[58] Field of Search .................. 260/683.48, 683.51

[56] References Cited
UNITED STATES PATENTS

| | | | |
|---|---|---|---|
| 3,253,054 | 5/1966 | Van Pool | 260/683.48 |
| 3,751,517 | 8/1973 | Hutson, Jr. et al. | 260/683.48 |
| 3,763,265 | 10/1973 | Hutson, Jr. et al. | 260/683.48 |
| 3,767,726 | 10/1973 | Hutson, Jr. et al. | 260/683.48 |
| 3,842,140 | 10/1974 | Hutson, Jr. et al. | 260/683.51 |

*Primary Examiner*—Delbert E. Gantz
*Assistant Examiner*—G. J. Crasanakis

[57] ABSTRACT

Ethyl fluoride present in the system HF catalyst improves the reaction permitting advantageous alkylation of isoparaffin with olefin higher than ethylene. The ethyl fluoride is either generated in situ, as by introducing ethylene into the alkylation zone, or added as such at a convenient place, the improver or modifier being present in amounts, say, in the general range of from about 0.5 to about 30, preferably about 5 to about 30 percent weight based on the total HF catalyst containing the same; the ethyl fluoride will yield the same octane values at considerably lower than conventional isoparaffin to olefin ratios or at such conventional ratios will increase the octane number or value of the product. Yields of desirable alkylate are improved. Thus, at comparable ratios of reactants, the yield obtained of high octane alkylate, which has an octane considerably better than that obtained without the ethyl fluoride, e.g. an increase of about three numbers, Research clear, is increased, e.g. 98 percent as compared with about 80 percent, the ratio of reactants isobutane and propylene for the specific values here given having been 11.6:1 with the ethyl fluoride and 9.8:1 without this modifier. With same reactants at a ratio of 11.6:1, octane was substantially the same as with ethyl fluoride in the system catalyst, added thereto, as it was at 34:1 without ethyl fluoride, e.g. it was 93.4 RON clear with ethyl fluoride and 92.6 RON clear without ethyl fluoride. Moreover, with ethyl fluoride at the lower ratio the yield of motor alkylate was higher than with the much higher ratio, i.e. 98 percent at 11.6:1 with the ethyl fluoride and only 93.5 at 34:1 without ethyl fluoride.

When ethyl fluoride is generated in the system, ethylene can be added as required to produce and to maintain the desired production of ethyl fluoride in the catalyst. Water is now maintained below about 3 weight percent of the catalyst phase, although higher amounts can be present.

Similar results, yields and alkylate qualities are obtained with mixtures of iosparaffin, e.g. isobutane and/or isopentane with an olefin, e.g. propylene and/or butylenes, and/or amylenes.

17 Claims, No Drawings

HF ALKYLATION OF ISOPARAFFIN WITH OLEFIN HEAVIER THAN ETHYLENE WITH ETHYL FLUORIDE AS REACTION IMPROVER

This is a continuation-in-part application of our co-pending application having Ser. No. 217,665, filed Jan. 13, 1972, now abandoned.

This invention relates to the alkylation of an isoparaffin with an olefin. It also relates to the alkylation of an isoparaffin with an olefin in the presence of an improver or modifier in the system catalyst to produce improved yields and quality of hydrogen fluoride catalyzed motor fuel alkylate. Further, the invention relates to the modification of a hydrogen fluoride alkylation catalyst.

In one of its concepts, the invention provides the presence of ethyl fluoride in an isoparaffin-olefin hydrogen fluoride catalyzed alkylation reaction, the ethyl fluoride being present in an amount of from about 0.5 to about 30 weight percent, preferably from about 5 to about 30 weight percent based upon the total system catalyst, including the fluoride, which permits the alkylation in which olefins higher or heavier than ethylene are employed or used to give increased yields and/or quality of alkylate, as judged by octane values, at conventional ratios of isoparaffin to olefin or the obtaining of the same octane value and yields, if not higher yields at substantially lower ratios of isoparaffin to olefin reactants. In another of its concepts, the invention provides a process as herein described which permits advantageously the reduction of the size of equipment required to segregate and to recycle the isoparaffin within the system.

In another concept of the invention, the ethyl fluoride is added to the system at a convenient place as into the acid or into the hydrocarbon phase or it is generated in situ by addition of ethylene together with the feed, for example, together with the olefinic feed or into the acid or hydrocarbon phase at a convenient place, or, as desired, the ethyl fluoride can be in part added as such and/or as ethylene. Ethylene and/or ethyl fluoride can be added continuously or intermittently to produce and maintain in the system the desired proportion of ethyl fluoride.

We have now discovered that the presence of ethyl fluoride in the system when alkylating an isoparaffin, for example, isobutane and/or isopentane with an olefin heavier or higher than ethylene, for example, propylene and/or butylenes and/or amylenes, etc., that it is possible to considerably reduce the external ratio or feed ratio of isoparaffin to olefin to the process. This results in considerable savings of construction and operation costs in that the amount of isoparaffin required to be segregated and recycled is considerably reduced.

Thus, we have found that when ethyl fluoride is present in the system, added thereto and/or generated in situ, as herein described, it is possible to obtain at conventional ratios of isoparaffin/olefin reactants considerably higher yields and higher octane values than heretofore or, alternatively, at lower reactant ratios to obtain the same if not higher yields and the same octane values as obtained heretofore with the conventional ratios of reactants.

An object of this invention is to provide a process for the alkylation of an isoparaffin with an olefin. Another object of this invention is to provide for the modification of a conventional isoparaffin/olefin alkylation process in which the olefin alkylated is higher or heavier than ethylene. Another object of the invention is to provide an improved alkylation process in which an isoparaffin is alkylated with an olefin heavier than ethylene to obtain higher yields and/or higher octane values. Still further object of the invention is to provide a process in which it is possible to obtain the same, if not higher yields and the same octane values in the alkylation of an isoparaffin with an olefin but at reduced reactant ratios.

Another object is to reduce the cost of fractionation of isoparaffin in the system.

A further object is to increase the solubility of isoparaffin in HF catalyst.

Other aspects, concepts, objects and the several advantages of this invention are apparent from a study of this disclosure and the appended claims.

According to the present invention, there is provided a process for the alkylation of an isoparaffin with an olefin heavier than ethylene which comprises alkylating said isoparaffin and olefin with hydrogen fluoride catalyst, there being present in the system a minor amount of ethyl fluoride.

Also according to the invention, the ethyl fluoride can be provided in situ as by adding ethylene to the operation at a convenient place as with the reactants or with the acid phase or to the acid phase or by adding externally produced ethyl fluoride. Still further, according to the invention, the amount of ethyl fluoride ordinarily present in the system will be from about 0.5 to about 30, preferably from about 5 to about 30 weight percent based upon the system catalyst, including in the system catalyst the amount of ethyl fluoride therein. Thus, in calculating the amount of ethyl fluoride to be added to the system it is to be upon analysis of the system catalyst, from about 0.5 to about 30, preferably from about 5 to about 30 weight percent thereof.

According to the present invention, the amount of ethylene which can be included in the feed stream will be up to about 30 percent by weight, preferably up to about 25 percent by weight, still more preferably up to about 15 percent by weight of the total olefin going into the system.

The ratios of the isoparaffin-olefin heavier than ethylene reactants will ordinarily be in the range of from about 2:1 to about 100:1, preferably 10:1 to 15:1, still more preferably from about 11:1 to about 14:1, on a mol basis. As ethylene is included in the operation, obviously, the mol ratio of isoparaffin to total olefin will become changed. And, therefore, adjustment may be needed to maintain a desired isoparaffin to olefin heavier than ethylene mol ratio.

The isoparaffins to which the process of the invention is particularly applicable are isobutane and/or isopentane. The olefins which are advantageously alkylated are propylene, the butylenes, amylenes. Small quantities of other olefins can be present in the olefinic feed. However, this is not now preferred.

The temperature in the alkylation reaction zone which can be continuously or batchwise operated but is now preferably continuously operated will be from about 35°F. to about 200°F., preferably from about 70°F. to about 120°F., with a temperature usually in the neighborhood of approximately 100°F. being quite satisfactory.

The catalyst/hydrocarbon volume ratio will usually be in the range of from about 1/4:1 to about 20:1. Now preferred catalyst to hydrocarbon volume ratio will be in the range of from about 2:1 to about 10:1, a more preferred value being in the neighborhood of about 4:1.

The pressure will normally be sufficient to maintain substantially all of the reactants essentially in liquid phase. A suitable pressure will be usually in the approximate range of about 150 psig to about 250 psig.

Contact times will range from about 10 seconds to about 10 minutes, usually about 1 minute will suffice.

It will be understood by one skilled in the art in possession of this disclosure that the essence of the invention is in the finding that ethyl fluoride being present during the reaction permits considerable modification very advantageously to increase yields and/or octane values and that the conditions selected by him can be determined to be optimum for any set of reactants or other reasons by mere routine tests.

Usually on start-up, ethyl fluoride and/or ethylene is added continuously to the system at a desired place as with the reactants or into the acid or hydrocarbon phase until the desired quantity of ethyl fluoride is present in the system. Thereafter, usually, only enough ethyl fluoride and/or ethylene will be added to maintain the preselected level of ethyl fluoride in the system.

Combinations of ethylene and ethyl fluoride can be used as noted herein.

Although not wishing to be bound thereby, it would now appear that the ethyl fluoride increases the solubility of isobutane in the HF catalyst, as shown in the data, so the very high internal ratio of isobutane to olefin is realized albeit there is employed a considerably lower external isobutane to olefin ratio. Thus, when no ethyl fluoride is present, the external isobutane to olefin ratio must be higher to obtain the same kind and quality of alkylate or quantity of alkylate than when ethyl fluoride is present.

The data tabulated below fully illustrate our invention. The olefin feeds used in the runs in Table I, Table II, and Table III, respectively, were: propylene; a 50—50 volume mixture of propylene and isobutylene; and a refinery olefin-containing stream including propylene, butylenes, and some amylenes, tabulated hereinbelow in Table III.

All runs were made using liquid hydrocarbon phase and liquid HF catalyst phase, liquid phases now being preferred.

In each run, HF catalyst was added to the reaction vessel and the hydrocarbon phase (olefins, isobutane, and different quantities of ethyl fluoride, $C_2H_5F$) was contacted with the catalyst phase. Nozzles located in the lower portion of the catalyst phase were used to charge the hydrocarbon phase to insure intimate contact between the hydrocarbon and catalyst liquid phases.

The amount of ethyl fluoride, which is the now preferred primary alkyl fluoride, used was less than that amount which produces a single liquid phase of the reaction mass of catalyst and hydrocarbon. Our presently preferred operation uses ethyl fluoride in an amount so that the two phases, hydrocarbon phase and HF catalyst phase, exist in the system.

Secondary and tertiary alkyl fluorides can not be used to activate our system since they react out in the reaction zone, usually existing only in the amount of a few parts per million range in the reaction zone.

In all runs, the hydrocarbon phase was recovered and fractionated to produce debutanized alkylate which was analyzed for octane, distillation, etc.

The water content of the HF catalyst phase is maintained below about 10 weight percent, and more preferably, below about 5 weight percent, and now is preferred to be maintained below about 3 weight percent to permit the ethyl fluoride to yield a desirable modification effect. The acid soluble oils (ASO) content of the HF catalyst is preferably maintained at less than about 5 weight percent, more preferably, below about 3 weight percent, still more preferably below about 1 weight percent of the HF catalyst phase. A conventional HF catalyst rerun unit can be used to effect the removal of the desired amounts of water and of acid soluble oils from the HF catalyst phase. Normally, a slip stream of catalyst is removed from the reaction zone and passed to the rerun unit, either continuously or intermittently.

Table I

|  | Run Number | | |
|---|---|---|---|
|  | 1 | 2 | 3 |
| Reactor Temperature, °F. | 95 | 90 | 94 |
| Isobutane/Propylene Mol Ratio | 11.6:1 | 9.8:1 | 34.1:1 |
| $C_2H_5F$ Charged, Wt. % of Propylene | 51.4 | 0 | 0 |
| Catalyst Composition: | | | |
| $H_2O$, Wt. % | 0.7 | 2.0 | 2.1 |
| HF, Wt. % | 69.6 | 90.4 | 94.4 |
| (a) Isobutane, Wt. % | 8.5 | 3.5 | 3.5 |
| Acid Sol. Oils, Wt. % | 0.03 | 0.7 | 0.02 |
| Ethyl Fluoride ($C_2H_5F$), Wt. % | 21.3 | 0 | 0 |
| Reactor Pressure | (To maintain liquid phases) | | |
| Contact Time, seconds | 68 | 60 | 65 |
| Catalyst/Total Hydrocarbon (Vol.) | 4:1 | 4:1 | 4:1 |
| Alkylate Product ($iC_5$ and Heavier): | | | |
| Reid Vapor Pressure, psi | 4.00 | 4.18 | 3.34 |
| End Point, °F. | 324 | 456 | 353 |
| Vol. % Motor Fuel Alkylate | 97.73 | 78.61 | 93.49 |
| Research Octane (O TEL) | 93.4 | 87.8 | 92.6 |
| Motor Octane (O TEL) | 91.8 | 87.7 | 91.0 |
| Research Octane (3 cc TEL) | 107.8 | 104.0 | 107.1 |
| Motor Octane (3 cc TEL) | 107.5 | 104.0 | 106.4 |

(a) Includes small amounts of propane and normal butane.

From the data in the above Table I, it can be seen that the invention Run 1, at 11.6:1 isobutane to olefin mol ratio, using ethyl fluoride to activate the system, produced a motor fuel alkylate of higher octane number and in a higher yield than the alkylate produced in Run 3 wherein no ethyl fluoride was used, but wherein the isobutane to olefin mol ratio was extremely high at 34.1:1. Run 2, using no ethyl fluoride and using an isobutane to olefin mol ratio of 9.8, approximately the ratio of Run 1, produced very low octane number and very low yield of motor fuel alkylate. Run 2 produced a 456°F. end point alkylate of which only about 78.6 weight percent was motor fuel alkylate (at maximum end point of 400°F.).

Table II

|  | Run Number | |
|---|---|---|
|  | 4 | 5 |
| Reactor Temperature, °F. | 149 | 146 |
| Isobutane/Olefins Mol Ratio | 11.4:1 | 12.1:1 |
| $C_2H_5F$, Wt. % of Olefins | 0 | 55.5 |

Table II-Continued

| | Run Number | |
|---|---|---|
| | 4 | 5 |
| Catalyst Composition: | | |
| $H_2O$, Wt. % | 0.9 | 1.4 |
| HF, Wt. % | 85.1 | 68.3 |
| (a) Isobutane, Wt. % | 4.0 | 9.2 |
| Acid Sol. Oils, Wt. % | 0.1 | 0.02 |
| $C_2H_5F$, Wt. % | 0 | 21.0 |
| Reactor Pressure | (To maintain liquid phases) | |
| Contact Time, seconds | 53 | 90 |
| Catalyst/Total Hydrocarbon (Vol.) | 4:1 | 4:1 |
| Alkylate Product ($iC_5$ and Heavier): | | |
| Reid Vapor Pressure, psi | 9.2 | 4.6 |
| End Point, °F. | 373 | 358 |
| Research Octane (O TEL) | 87.3 | 90.4 |
| Motor Octane (O TEL) | 86.1 | 89.4 |
| Research Octane (3 cc TEL) | 100.7 | 104.0 |
| Motor Octane (3 cc TEL) | 102.6 | 104.9 |

(a) Includes small amounts of propane and normal butane.

Runs 4 and 5 used approximately the same isobutane/olefins mol ratios, but Run 5 of the invention, using ethyl fluoride in the system, produced much higher octane alkylate.

tane number motor fuel alkylate. Runs 7 through 12 demonstrate the octane improvement using ethyl fluoride, a primary alkyl fluoride, in the HF alkylation system. In view of the end points, Run 6 produced the smallest quantity of motor fuel alkylate (end point was 422°F.) of all of the runs.

In all runs using ethyl fluoride, it can be seen that as the amount of ethyl fluoride in the HF catalyst phase is increased, that the isobutane content of the HF catalyst phase is also increased. It is believed that the higher octanes are realized by our invention because of the improved hydrocarbon (e.g., isobutane) solubility in the catalyst phase, which solubility increase is afforded by the presence of ethyl fluoride in the HF catalyst phase.

The data in Table IV below were obtained using a mixed propylenebutylenes plant feed (about 50—50 volume percent propylene-butylenes) to alkylate isobutane using an HF catalyst having different amounts of ethyl fluoride modifier and of water therein. The isobutane to total olefin mol ratio in each run was 14:1. The

Table III

The plant olefin stream had the following composition:

| Component | Wt. % | Wt. % (Paraffin-Free) |
|---|---|---|
| Ethane | 0.0 | 0 |
| Propane | 5.4 | 0 |
| Propylene | 18.0 | 40.69 |
| Isobutane | 37.9 | 0 |
| Normal Butane | 5.9 | 0 |
| Isobutylene and Butene-1 | 12.5 | 28.25 |
| trans-Butene-2 | 6.1 | 13.79 |
| cis-Butene-2 | 4.3 | 9.72 |
| Isopentane | 3.3 | 0 |
| 3-Methyl Butene-1 | 0.5 | 1.22 |
| Normal Pentane | 0.4 | 0 |
| Heavier than n-Pentane* | 5.7 | 6.33 |
| | 100.0 | 100.0 |

* Includes amylenes.

| | Run Number | | | | | | |
|---|---|---|---|---|---|---|---|
| | 6 | 7 | 8 | 9 | 10 | 11 | 12 |
| Reactor Temperature, °F. | 92 | 91 | 90 | 95 | 92 | 95 | 93 |
| Isobutane/Olefin Mol Ratio | 13.8:1 | 12.9:1 | 12.2:1 | 13:1 | 12.2:1 | 13:1 | 13.7:1 |
| $C_2H_5F$ Charged, Wt. % of Olefin | 0 | 19.5 | 44.1 | 46 | 62 | 62.5 | 71.2 |
| Catalyst Composition: | | | | | | | |
| $H_2O$, Wt. % | 0.5 | 1.0 | 0.7 | 0.5 | 0.6 | 0.9 | 0.9 |
| HF, Wt. % | 95.0 | 86.3 | 78.6 | 73.2 | 70.0 | 62.6 | 55.1 |
| (a) Isobutane, Wt. % | 3.4 | 5.1 | 7.0 | 8.5 | 9.3 | 13.0 | 17.2 |
| Acid Sol. Oils, Wt. % | 0.3 | 0.2 | 0.3 | 0.3 | 0.4 | 0.4 | 0.1 |
| $C_2H_5F$, Wt. % | 0 | 7.4 | 13.2 | 17.5 | 19.6 | 23.1 | 26.7 |
| Reactor Pressure | (To maintain liquid phases) | | | | | | |
| Alkylate Product ($iC_5$ and Heavier): | | | | | | | |
| Reid Vapor Pressure, psi | 6.4 | 5.3 | 4.6 | 4.9 | 4.9 | 5.2 | 5.1 |
| End Point, °F. | 422 | 408 | 382 | 366 | 371 | 378 | 370 |
| Research Octane (O TEL) | 88.4 | 90.1 | 91.3 | 91.8 | 91.6 | 91.9 | 92.3 |
| Motor Octane (O TEL) | 88.1 | 89.8 | 90.7 | 90.8 | 90.6 | 91.0 | 91.1 |
| Volume Alkylate/Volume Olefin | 1.8 | 1.8 | 1.8 | 1.8 | 1.8 | 1.8 | 1.8 |

(a) Includes a small amount of propane and normal butane.

In Runs 6 through 12, contact times were about one minute, and the catalyst to total hydrocarbon volume ratios were approximately 4:1.

Run 6, using no ethyl fluoride and using an isobutane to olefin mol ratio of 13.8:1, produced the lowest octane reaction temperature in each run was 90°F. The contact or residence time in each run was about one minute. The pressure at 190 psig was sufficient to maintain liquid phases in all runs. The catalyst to hydrocarbon volume ratio was 4:1.

Table IV

| Weight Percent | | Alkylate (iC₅+) |
| --- | --- | --- |
| H₂O in HF | C₂H₅F in HF | Research Octane, Clear |
| 0.3 | 0 | 88.8 |
| 0.3 | 10 | 92.2 |
| 0.5 | 0 | 90.2 |
| 0.5 | 10 | 92.6 |
| 0.75 | 0 | 91.5 |
| 0.75 | 10 | 92.9 |
| 1.0 | 0 | 92.3 |
| 1.0 | 10 | 93.0 |
| 1.25 | 0 | 92.8 |
| 1.25 | 10 | 93.1 |
| 1.50 | 0 | 93.0 |
| 1.50 | 10 | 93.1 |
| 1.75 | 0 | 93.2 |
| 1.75 | 10 | 93.3 |

The above data are an indication that as about 3 percent H₂O by weight of the total HF catalyst phase is approached, the ethyl fluoride tends to lose its effect with respect to advantages for its inclusion as herein discussed. According, the water in the HF catalyst phase should be maintained below about 5 weight percent, preferably below about 3 weight percent of the HF catalyst.

It can be seen in Table IV that when the water in the HF catalyst is relatively low, the $C_2H_5F$ has a greater effect on octane increase than when the water content is relatively high. It is, of course, preferred to operate an HF alkylation unit with a relatively low amount of water to minimize the corrosion of carbon steel, commonly used in plant construction.

The data herein in light of the knowledge in this art indicate that the pressures herein specified, e.g. above about 150 psig, will maintain a sufficient liquid phase to obtain the advantages of the invention.

Reasonable variation and modification are possible within the scope of the foregoing disclosure and appended claims to the invention, the essence of which is that it has been discovered that the presence of ethyl fluoride in the hydrogen fluoride alkylation of an isoparaffin with an olefin heavier than ethylene considerably modifies and improves the alkylation reaction so that much lower ratios of isoparaffin to olefin reactants can be employed or alternatively at conventional ratios of reactants higher yields and higher octane values can be obtained.

We claim:

1. The process for the alkylation of at least one isoparaffin selected from isobutane and isopentane and mixtures thereof in the presence of HF catalyst, with at least one olefin selected from propylene and butylene, employing in the alkylation reaction system ethyl fluoride as an activator for said HF catalyst in an amount of about 0.5 to about 30 percent by weight of the total catalyst which includes said ethyl fluoride.

2. A process according to claim 1 wherein the isoparaffin to olefin ratio is in the range 2:1–100:1.

3. A process according to claim 1 wherein the isoparaffin to olefin ratio is in the range 10:1–15:1.

4. A process according to claim 1 wherein the catalyst to hydrocarbon ratio is in the range of from 1/4:1 to about 20:1, by volume.

5. A process according to claim 1 wherein the ethyl fluoride is introduced into said process with at least one of said isoparaffin or said olefin.

6. The process of claim 1 wherein the olefin feed also contains up to about 30 weight percent ethylene.

7. The process of claim 1 wherein the olefin feed also contains up to about 25 weight percent ethylene.

8. The process of claim 1 wherein the olefin feed also contains up to about 15 weight percent ethylene.

9. The process of claim 6 wherein water is present in an amount up to about 3 percent by weight of said total catalyst.

10. The process of claim 9 wherein the ethyl fluoride is present in the range of from about 0.5 to about 10 weight percent of said total catalyst.

11. The process of claim 7 wherein water is present in an amount up to about 3 percent by weight of said total catalyst.

12. The process of claim 8 wherein water is present in an amount up to about 3 percent by weight of said total catalyst.

13. The process of claim 11 wherein the ethyl fluoride is present in the range of from about 0.5 to about 10 weight percent of said total catalyst.

14. The process of claim 12 wherein the ethyl fluoride is present in the range of from about 0.5 to about 15 weight percent of said total catalyst.

15. The process of claim 10 wherein the isoparaffin to total olefin mole ratio is in the range of from about 2:1 to about 100:1 and wherein the catalyst to hydrocarbon volume ratio is in the range of from about one-fourth to about 20:1.

16. The process of claim 13 wherein the isoparaffin to total olefin mole ratio is in the range of from about 2:1 to about 100:1 and wherein the catalyst to hydrocarbon volume ratio is in the range of from about one-fourth to about 20:1.

17. The process of claim 14 wherein the isoparaffin to total olefin mole ratio is in the range of from about 2:1 to about 100:1 and wherein the catalyst to hydrocarbon volume ratio is in the range of from about one-quarter to about 20:1.

* * * * *